July 14, 1953   M. GOLIAS   2,645,050
ILLUMINATED SIGNAL FOR FISHING POLE HOLDERS
Filed Aug. 15, 1950
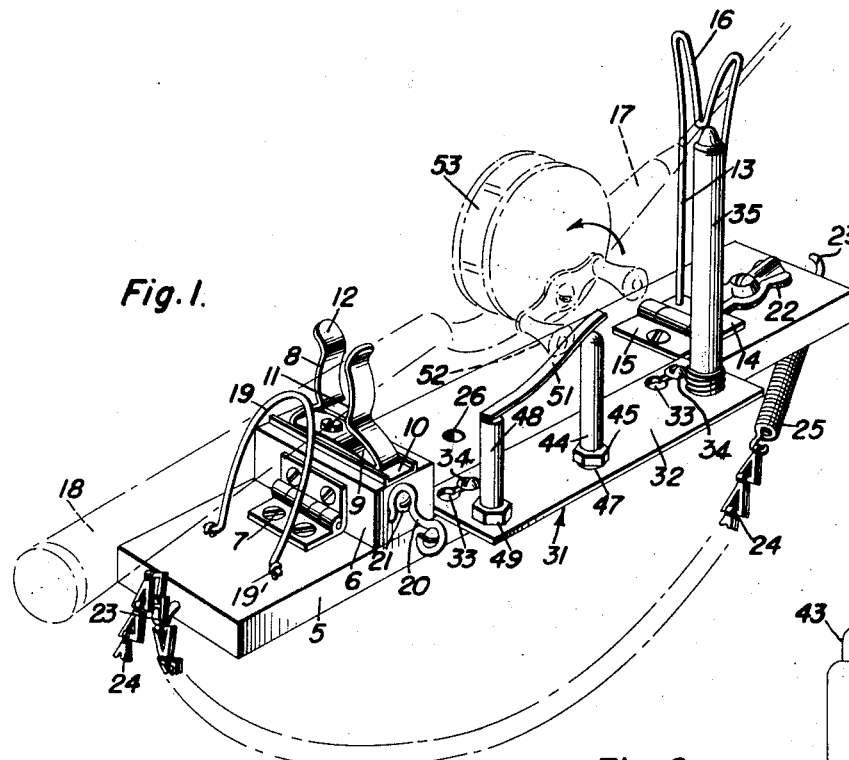
Fig. 1.
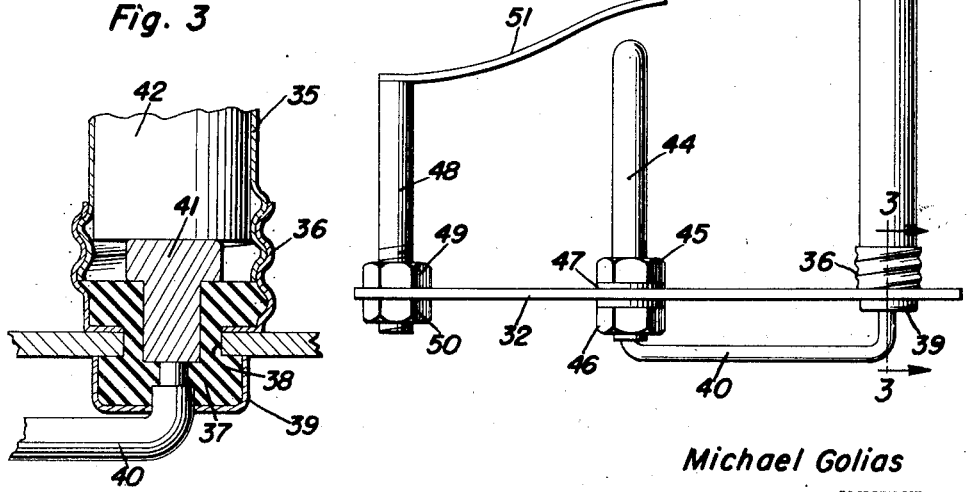
Fig. 3.
Fig. 2
Michael Golias
INVENTOR.
BY *[signatures]*
Attorneys Patented July 14, 1953

2,645,050

UNITED STATES PATENT OFFICE 2,645,050

ILLUMINATED SIGNAL FOR FISHING POLE HOLDERS

Michael Golias, Sharon, Pa.

Application August 15, 1950, Serial No. 179,590

2 Claims. (Cl. 43—17)

The present invention relates to new and useful improvements in holders or supports for fishing rods and more particularly to illuminated signalling means on the holder.

An important object of the invention is to provide an illuminated signalling attachment for a fishing rod holder for use when night fishing and wherein a flashlight lamp is controlled by a switch actuated by the handle of a reel when a fish pulls on the line.

A further object of the invention is to provide a self-contained illuminated signalling attachment which may be easily and quickly attached in position to a fishing pole holder whereby the holder may be used either with or without the signalling attachment.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the fishing rod holder with the illuminated signalling attachment in position thereon;

Figure 2 is an enlarged side elevational view of the illuminated signalling attachment removed from the fishing rod holder; and, Figure 3 is an enlarged fragmentary sectional view taken on a line 3—3 of Figure 2.

Referring now to the drawing in detail wherein for the purpose of illustration I have disclosed a preferred embodiment of the invention the numeral 5 designates a base of a rectangular shape and preferably constructed of wood or other suitable material and to the upper surface of which and adjacent one end thereof is secured a block 6 by means of a conventional hinge structure 7.

A resilient clip 8 is constructed of resilient strap metal and shaped to provide a base portion 9 secured in a channel member 10 on top of block 6 by means of a screw or the like 11. The clip 8 includes upstanding resilient jaws 12.

An inverted substantially U-shaped wire support 13 has its end portions welded or otherwise suitably secured to a hinge plate 14 of a conventional hinge structure, while the other plate 15 thereof is secured on top of base 5 adjacent its other end. The top of support 13 is bent downwardly to form a V-shaped seat 16 in which a fishing rod 17 rests while the handle 18 of the rod is engaged in clip 8. The support 13 extends upwardly above clip 8 to support the rod in an upwardly inclined position, as indicated in Figure 1 of the drawing.

A substantially U-shaped wire locking bail 19 has its ends swingably mounted in eyes 19' on base 5 rearwardly of block 6 for swinging in position on top of handle 18 of the rod to lock the rod engaged in clip 8.

Block 6 is secured against movement on base 5 by means of a pivoted hook 20 secured to one edge of the base and engaging a pin 21 projecting outwardly from an adjacent end of the block. Hinge plate 14 with the support 13 attached thereto is also secured against movement on the base by means of a pivoted catch 22 which is movable into and out of position overlying the hinge plate 14.

Clip 8 and support 13 may be folded downwardly upon base 5 when the device is not in use by releasing hook 20 and swinging block 6 rearwardly on hinge 7 to thus lower clip 8 and support 13 and hinge plate 14 may be released by swinging catch 22 out of engagement with the hinge plate and swinging support 13 downwardly on top of the base 5.

Hooks 23 are provided at each end of the base 5 to which a chain 24 and a coil spring 25 are attached for securing the base to a suitable supporting structure (not shown) and the central portion of the base is also provided with an opening 26 by means of which the base may be attached to a suitable supporting structure.

The fishing rod holder is used by securing base 5 in a desired position by either chain 24 or attaching the base for swinging movement on a suitable object by fastening means inserted in opening 26. The handle 18 of a fishing rod 17 is then snapped in clip 8 with the rod resting in seat 16 and front support 13 to hold the rod in an upwardly inclined position. Bail 19 is then swung over the handle 18 to secure the rod against accidental removal from the holder.

The illuminated signalling attachment forming the subject matter of the present invention is designated generally at 31 and is provided for use at night and comprises a metal plate 32 having key hole slots 33 at each end for receiving the heads of screws 34 on base 5 adjacent one side edge for quickly attaching the plate thereto.

A flashlight case 35 is threaded at its lower end to engage a threaded socket 36 held on top of plate 32 by a rubber filler or some other suitable insulator 37 secured in an opening 38 of the plate and having its lower end enclosed in a cover 39 soldered to the underside of the plate. A circuit wire 40 extends upwardly into cover 39 and through rubber filler 37 and with a terminal 41 at the inner end of the wire engaging the base of a flashlight battery 42 in case 35. A lamp 43 is mounted at the top of case 35.

Wire 40 extends under plate 32 to the lower end of a conductor post 44 secured on top of plate 32 by upper and lower nuts 45 and 46 and insulated from the plate by fiber washers 47. Lower nut 46 connects the wire to the post.

A switch post 48 is secured in an upstanding position by upper and lower nuts 49 and 50 and a resilient switch arm 51 is secured at one end to the top of post 48 and with its free end overlying the upper end of post 44 and spaced therefrom.

The switch arm 51 is positioned in the path of the handle 52 of a fishing reel 53 attached to fishing rod 17 to strike the switch arm and close the switch when the reel is rotated by the paying out of the line when a fish is caught thereon and thus energize the lamp of the signal in a make and break action to cause a flashing of the lamp.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A fishing rod holder comprising an elongated base having front and rear ends, a resilient clip upstanding adjacent the rear end of the base for engaging the handle end of a fishing rod, means to attach said clip to said base, a fishing rod support upstanding from said base adjacent its front end for supporting the fishing rod forwardly of said handle end, a U-shaped bail hinged to said base adjacent said clip for swinging over said handle end to lock said handle end engaged with said clip, a plate extending from one side of the base, a flashlight supported on said plate, and a flashlight controlling switch supported on plate between said clip and fishing rod support for closing by the handle of the reel on said fishing rod.

2. A fishing rod holder according to claim 1, said bail being swingable to fold the same against said base when not in use, and said means and support being hinged to said base for folding of the clip and support against the base when not in use.

MICHAEL GOLIAS.

References Cited in the file of this patent

UNITED STATES PATENTS

| Number | Name | Date |
|---|---|---|
| 2,059,712 | Schellenger | Nov. 3, 1936 |
| 2,184,583 | Danko | Dec. 26, 1939 |
| 2,293,318 | Thirlwell | Aug. 18, 1942 |
| 2,481,881 | Schneider | Sept. 13, 1949 |
| 2,538,788 | Massino | Jan. 23, 1951 |
| 2,567,777 | Massino | Sept. 11, 1951 |